United States Patent [19]

Yin et al.

[11] 3,797,595
[45] Mar. 19, 1974

[54] SYSTEM FOR DIGITAL WEIGHING WITH ZEROIZING FOR THERMAL EFFECTS

[75] Inventors: Chieh-Kung Yin, Grayslake; Roy W. Klein, Hoffman Estates; Bernard A. Johnson, Deerfield, all of Ill.

[73] Assignee: Mangood Corporation, Chicago, Ill.

[22] Filed: Dec. 11, 1972

[21] Appl. No.: 313,965

[52] U.S. Cl............. 177/164, 177/210, 177/DIG. 3
[51] Int. Cl. ........................ G01g 23/14, G01g 3/14
[58] Field of Search . 177/210, 211, DIG. 1, DIG. 3, 177/50, 164

[56] References Cited
UNITED STATES PATENTS

| | | | |
|---|---|---|---|
| 3,709,309 | 1/1973 | Williams, Jr. et al. | 177/DIG. 3 |
| 3,525,991 | 8/1970 | Kohler | 177/211 X |
| 3,565,194 | 2/1971 | Engle et al. | 177/50 |

Primary Examiner—George H. Miller, Jr.
Attorney, Agent, or Firm—Claron N. White

[57] ABSTRACT

A system for digital weighing, by utilizing an analog voltage of load cells representative of the weight of a load to be weighed, includes an analog-to-digital converter with a preamplifier and an integrator, a switch to connect the load cells to a power supply, means to turn off and on the switch, means to generate and store a signal based at least in part on the thermal voltage output of the load cells when the switch is off, and means to utilize that signal during the use of the analog-to-digital converter in a subsequent weighing operation when the switch is on. Preferably the system uses an analog-to-digital converter having a switch to couple the preamplifier to the integrator for a period of time and a switch to couple thereafter a reference voltage to the integrator during operation of the conversion. While these three switches are off, another switch is on. It couples the output of the preamplifier to a compensating circuit with a feedback to the preamplifier of opposite polarity voltage compensating for the thermal voltage of the load cells and the offset voltage and current of the preamplifier. The switch to the compensating circuit is off when the other switches are on.

14 Claims, 3 Drawing Figures

SYSTEM FOR DIGITAL WEIGHING WITH ZEROIZING FOR THERMAL EFFECTS

BACKGROUND OF THE INVENTION

1. Field of the Invention

This invention relates to systems for weighing a load by creating an analog voltage in load cells generated by the weight of the load and the weight of the platform or the like on which the load is placed and on which the load cells are mounted. The systems convert the analog voltage to a digital value indicating the combined weights creating the voltage output of the load cells and usually, by compensating for the voltage generated by the weight of the platform or the like, indicating the weight of the load being weighed. The digital value is displayed and/or recorded as the weight. The systems are known as analog-to-digital weighing systems.

2. Description of the Prior Art

Many systems for conversion of an analog signal to a digital value are known. Reference is made to "Analog-to-Digital/Digital-to-Analog Conversion Techniques" by David F. Hoeschele, Jr., published in 1968 by John Wiley & Sons, Inc., New York, N.Y., particularly to pages 355–429. Patents that disclose the use of analog-to-digital converters in conjunction with load cells providing the analog voltage for the converters are U.S. Pat. Nos. 3439524, 3662845, 3662846 and 3674097.

The first of these patents uses a voltage-to-frequency conversion by a voltage-controlled oscillator as part of its analog-to-digital conversion weighing system. That oscillator is connected through a subtracting counter to a weight counter. The subtracting counter counts 100 pulses from that oscillator at the start of a fixed period of time during a weigh cycle or a checking cycle and then establishes connection between that oscillator and the weight counter for the latter to count pulses for the balance of that fixed time interval.

The system of that patent includes circuitry that in the weigh cycle just prior to that fixed time interval applies pulses at a fixed frequency from a second oscillator to the weight counter for a period of time that normally provides a 100-pulse count in the weight counter. In that circuitry there is a storage register. The condition of the storage register at the start of a cycle of operation of the system determines the period of time that the second oscillator applies pulses to the weight counter and thus determines the count in the weight counter before it receives pulses from the voltage-controlled oscillator. That system also includes circuitry that is used in a checking cycle to change the condition of the storage register so that due to its changed condition there will be a change in the time of applying pulses from the second oscillator to the weight counter in a subsequent weigh cycle. The decrease or increase in the number of pulses from the normal 100 pulses will correspond to any change in the output of the load cells from the normal zero output to which the load cell circuitry has been set while mounted on the weighing platform and power applied to the load cell circuitry. Such change would produce a weighing error and, as pointed out by the patent, may be due to variations in temperature or ambient pressure etc.

To compensate for this drift in the output of the load cells that may have occurred prior to a weighing cycle of operation of the system a checking cycle is performed. The checking cycle is initiated by momentarily closing a manual switch to energize a relay having contacts that remain closed for a short period of time to place a reference potential, representing a predetermined simulated load on the platform, at the output side of the load cells. The input voltage to the voltage-controlled oscillator will be that reference potential as affected by the output voltage of the load cells due to the drift. If there has been a drift, the output frequency of that oscillator will be other than the output frequency obtainable solely by the reference voltage.

At the start of this short period of time the closing of other contacts of this relay connects the storage register to ground and this resets that register to zero from its normal condition at the start of a weigh cycle. During this short period of time there is included the fixed time interval during which the voltage-controlled oscillator provides 100 pulses to the subtracting counter and then to the weight counter, but before that fixed time interval pulses from the voltage-controlled oscillator are applied for a set period of time to the storage register.

If there has been no drift the number of pulses to the storage register will change it to its normal condition from which count it counts pulses received from the second oscillator at the start of a weigh cycle to a specific count condition when it then stops the application of pulses being sent from that oscillator to the weight counter. When this occurs 100 pulses have been counted by the weight counter.

If there has been a drift the number of pulses to the storage register from the voltage controlled oscillator will not correspond to those obtainable solely by the reference potential applied to the voltage-controlled oscillator. In that case, at the end of the set period of time the storage register will not be at its normal condition for the start of a weigh cycle. As a result the system will operate during each subsequent weighing cycle to apply other than 100 pulses from the second oscillator to the weight counter prior to the application of pulses during the fixed time interval from the voltage-controlled oscillator to the weight counter. This is because the storage register at the conclusion of the checking cycle has, due to the drift, a different count than that for its normal condition and from that count it will take more or less time than normal, when receiving pulses from the second oscillator during a weigh cycle, to reach a count at which it closes a gate to stop the application of pulses from the second oscillator to the weight counter.

Of course, in this system of the patent the checking cycle is performed before a load to be weighed is on the weighing platform. For both cycles power is applied to the load cells.

The second and fourth patents use an up-down integrating A/D (analog-to-digital) converter basically described on pages 381-4 of the Hoeschele book mentioned above. The systems of these two patents correct for dead weight (weight of the platform) by the use of an adjustable voltage of opposite sign to that of the load cell voltage that is applied with the load cell voltage to a suitable summing junction in a conditioning and amplifier circuit. The output of the latter is applied to the input of the converter.

The third patent uses an analog-to-digital converter for which details are not disclosed. Instead the patent refers to a copending application.

None of the second through fourth patents refers to any construction of a system by which there is compensation for zero drift of the thermal voltage of the load cell circuit. It is apparent in the light of the description of the present application that none of the weighing systems of the patents describes any means to compensate for such drift.

Others have disclosed an analog-to-digital weighing system in which an operational amplifier is coupled to the load cells that are connected through a switch to a power supply. While that switch is closed the output voltage of the load cells and the thermal voltage of the load cell circuit are applied as an analog voltage to the operational amplifier. The output of that amplifier is applied to an integrating amplifier through a second switch that is ganged with the first switch and thus closed when the first switch is closed. The integrating amplifier's output voltage of opposite sign to that of the analog voltage is fed back to the operational amplifier. A dead weight voltage, also of opposite polarity, corresponding to the weight of the platform or the like is coupled to the operational amplifier while both switches are closed. Eventually the feedback voltage is such that the output voltage of the operational amplifier is zero volts.

To perform a weighing operation with that system the switches are opened and, of course, the dead weight voltage is no longer applied. Now the only voltage from the load cells is the thermal voltage. The feedback voltage compensates for this and provides an additional voltage representing the weight of the load. A control logic circuit applies from a voltage generator reference voltages of the same polarity as that of the analog voltage from the load cells when the switch between the power supply and the load cells was closed. The reference voltage is applied to the operational amplifier. The generator under the control of the logic circuit can provide voltages of different levels that differ from adjacent levels by a factor of 10 and that represent different orders of decimal value and can provide at each level voltage increasing steps of voltage of decimal digital value.

Through the control of the logic circuit the first voltage applied is the lowest step of the highest level and the steps are increased at that level until the operational amplifier reverses polarity of its output. Then the logic circuit decreases the applied voltage to the next lower step of that level and enters the value of that voltage in a digital counter. Next the voltage is increased by decimal digital steps within the next highest order of decimal value until the polarity again reverses. At that time the logic reduces the voltage applied to the next lower step of that level of voltage and that value is entered in the digital counter. This process is continued through successively lower orders of decimal value until the digital value of the lowest level has been entered. The logic then transfers the final digital count containing the digital values at all levels to a display and/or a printer.

This weighing system provides one way of compensating for the thermal voltage of the load cell circuit by using that voltage at the operational amplifier throughout the weighing operation. The thermal voltage and the feedback voltage representing in part a voltage corresponding to the thermal voltage, but opposite in sign, are inputs to the operational amplifier during the generating and use of the reference voltage and the entering of digital information in the counter. It is seen also that part of the feedback voltage to the operational amplifier represents the analog voltage of the load cells due to the dead weight, i.e., the weight of the platform or the like.

SUMMARY OF THE INVENTION

This invention relates to a system for digital weighing by utilizing an analog voltage of load cells generated in part by a load to be weighed. The system comprises a switch to electrically couple the load cells to a power supply, means to turn off and turn on the switch, means operative when the switch is off to generate and store a signal having a magnitude based at least in part on the thermal voltage component only of the voltage output of the load cells, an analog-to-digital converter, means to operatively couple the converter to the output of the load cells for at least part of the operation of the converter when the switch is on to generate an analog voltage from the load cells due to the weight affecting the cells, and means to utilize the stored signal in the converter during a part of the operation of the converter in a manner to provide a final digital output of the converter essentially devoid of any digital value representative of the thermal voltage of the load cells.

In the preferred embodiment of the system of the present invention, the analog-to-digital converter includes a preamplifier, an integrator (herein called an A to D integrator), a comparator coupled to the output of the integrator, and a switch coupling the output of the preamplifier to the integrator. Also coupled to the integrator through another switch is means to provide a reference voltage of opposite polarity to the output voltage of the preamplifier. The converter further includes means to operate these switches, between the integrator and the preamplifier and between the integrator and the means to provide the reference voltage, so that when one of the switches is on, the other switch is off. The system includes means to have both of these switches off when the switch connecting the power supply to the load cells is off.

The output of the preamplifier is also coupled through another switch (herein called a thermal zero switch) to a compensating signal-generating circuit including an integrator, an inverter coupled to the output of that integrator, and a feedback line coupling the output of the inverter to the preamplifier. The switch of the compensating circuit is on when the switch (herein called the power switch) for connecting the power supply to the load cells is off, and the thermal zero switch is off when the power switch is on. While the power switch is off, the compensating circuit, in view of the thermal zero switch being on, will in time provide an input voltage to the preamplifier that is equal, but of opposite sign, to the input voltage from the load cells at that time, i.e., the thermal voltage of the load cells, as affected by the offset voltage and current of the preamplifier compensation so that the output of the preamplifier is zero volts. This overall compensation feedback voltage is maintained during the subsequent period of time during which the thermal zero switch is off and the power switch is on. As a result during that later period of time the output of the preamplifier through the then on preamplifier switch to the A to D integrator does not include the thermal voltage of the load cells and the offset voltage and current effects of the preamplifier at least as of the time just before the thermal zero switch was turned off. The compensating circuit constitutes means to generate and store a signal that has a magnitude based at least in part on the thermal voltage component only of the output voltage of the load cells. In this system that stored signal is used during the operation of the converter.

In an especially preferred aspect of this embodiment of the system of the invention, there is a circuit to compensate for the thermal and offset voltages of the A to D integrator of the converter. That circuit includes a sample-and-hold circuit coupled to the output of the comparator through a switch (herein called A to D offset switch). The sample-and-hold circuit has its output coupled to the input of the A to D integrator. In addition the line coupling the reference voltage switch to that integrator is connected to ground through a switch (herein called A to D zero switch). This system has means to turn off the A to D offset switch and the A to D zero switch when the reference voltage switch is turned on and to turn on the former switches when the latter switch is turned off.

The converter of this preferred embodiment includes an AC coupled DC amplifier coupled to the output of the comparitor, which is a DC amplifier/comparator, to provide a pulse, when the reference voltage switch is on to connect the reference voltage to the A to D integrator for a long enough period of time for the output of the DC amplifier/comparator to effectively cross zero volts.

The preferred embodiment includes a logic circuit, means to turn off and on the various switches mentioned above in a controlled sequence of operation, means to control the period of time that the preamplifier switch is on, up-down decade counters to count pulses for the period of time that the reference voltage switch is on, and means to initiate the means to turn off the reference voltage switch when the output of the comparator crosses zero volts. This system further includes output latches in which to enter the accumulated count in the up-down counters at the time that the reference voltage switch is turned off thereafter, at least before those counters are reset in the next cycle of operation of the system. There are dead weight latch means (herein called zero latches or dead load zero latch) in which are entered the count in the up-down counters after the reference voltage switch is turned off in a dead weight zero cycle of operation of the system without a load on the platform. There are means to enter the stored digital value in the zero latches into the up-down counters and enable the latter for a down count mode and means responsive to the counter at the down count reaching zero to enable it for an up count for the balance of the counting period.

When the cycle of operation of the system is initiated by a pulse that is herein called a weigh enable pulse, the cycle is a weigh cycle, i.e., one with a load on the platform, and the load less the weight of its container, e.g., a truck, is to be determined, the system contains tare latches that are set to correspond to the known weight of the container. The digital value of the tare latches are entered in the up-down counters when the latter reach zero in a count down of the entered digital value of the zero latches. The down count is enabled and the ensuing pulses reduce again the count until the count is zero. Then the logic circuit enables the counters to the up count mode and the balance of the pulses to the counters are counted. The pulses stop when the reference voltage switch is turned off.

When the cycle of operation of the system is initiated by a pulse that is herein called a zero enable pulse, the cycle provides a digital value to the zero latches. That value is entered there instead of into the output latches and represents the weight of the platform or the like. In this cycle of operation the up-down counters count up for the entire period of time that the reference voltage switch is on.

The function of the logic circuit to provide the pulses to the up-down counters, to control the counters in the up or down count mode, to enter the count on the various latches, and to receive instructions, and the nature of other components of the preferred embodiment of the system are described later in detail.

The construction of the other illustrative embodiment of the present system will be seen later in the presentation of it also in some detail. In that embodiment the compensation for thermal voltage of the load cells is made digitally, whereas the preferred embodiment provides an analog compensation. In this other illustrative embodiment, a voltage-controlled oscillator for a definite period of time provides pulses at a frequency that is dependent on the analog voltage. These pulses are counted by an up-down counter.

That embodiment of the system also has a switch for connecting the load cells to the power supply. The system has a logic circuit that controls the switch. Dependent upon which command signal is given to the logic, the system will perform one of several different cycles of operations. For a cycle of operation called a thermal zero cycle, the logic turns off the switch for the definite period of time and enables the up-down counter in the up count mode for that entire time, after which the digital value of the counter is entered in a thermal zero latch for use either in the cycle of operation called a dead load zero cycle or in the cycle of operation called a weigh cycle. During both of the latter two cycles of operation the switch is on.

In a dead load zero cycle, the digital value of the thermal zero latch is entered in the up-down counter through a multiplexer that is enabled to do so by the logic that enables the counter in the down count mode. The pulses are counted down until the counter reaches zero when it signals the logic. Then the logic through the multiplexer enables the counter in the up count mode and the count is up for the balance of the definite period of time. Then the count is entered in a dead load zero latch as a digital value directly proportional to the analog signal representing the weight of the platform. The thermal voltage of the load cells is compensated for digitally by the count down phase.

In a weigh cycle, the logic provides for two down count operations before the counter is enabled in the up count mode for the balance of the definite period of time. One down count operation, of course, is after entering the digital value of the thermal zero latch in the counter. When the counter reaches zero, the value in the dead load zero latch is entered in the counter and the down count mode is continued. When the count again reaches zero, the counter is enabled in the up count mode for the balance of the time. Then the count in the counter is entered in a weight latch and represents the gross weight of the load on the platform.

To provide the entry of a net weight of the load, i.e., the weight of the product on a truck on the platform, this system includes a tare latch in which is entered the weight of the truck. In this modification of this second embodiment of the system, there are three down counts with the value in the tare count being entered in the counter when it reaches zero for the second time. When the counter reaches zero for the third time, the logic enables the counter in the up count mode for the balance of the time, after which the digital value is entered in the weight latch, then called a net latch. With further modification there can be obtained a digital value in a separate gross load latch representing the gross weight of the load on the platform. In this case there is an up counter that is enabled to count up when the up-down counter reaches zero for the second time.

DESCRIPTION OF THE DRAWINGS

In a few instances the same numeral is used for the same component in both embodiments.

DETAILED DESCRIPTION

Figure 1:
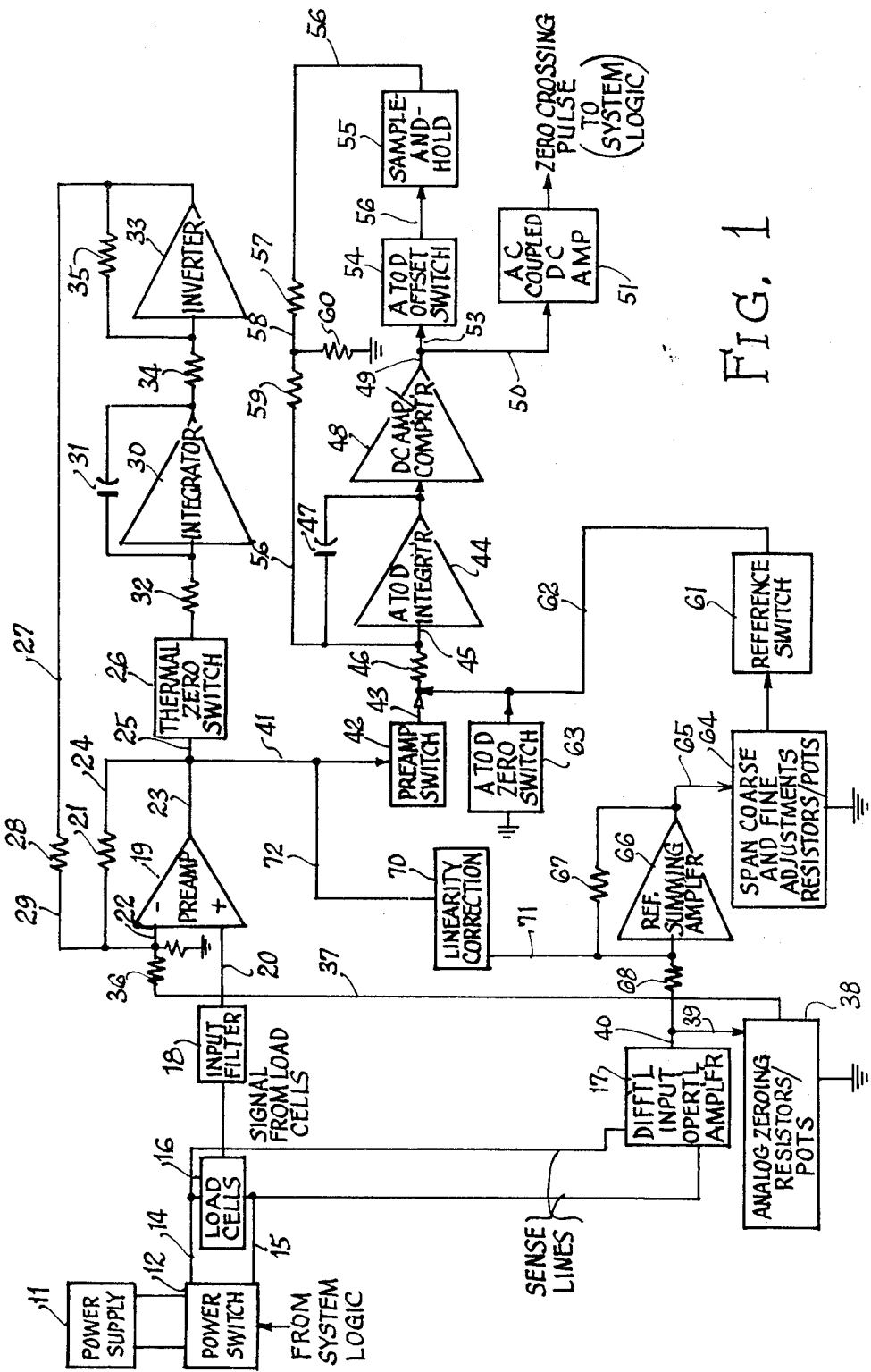
FIG. 1 is a schematic drawing of the preferred embodiment of the system of the present invention.
Figure 2:
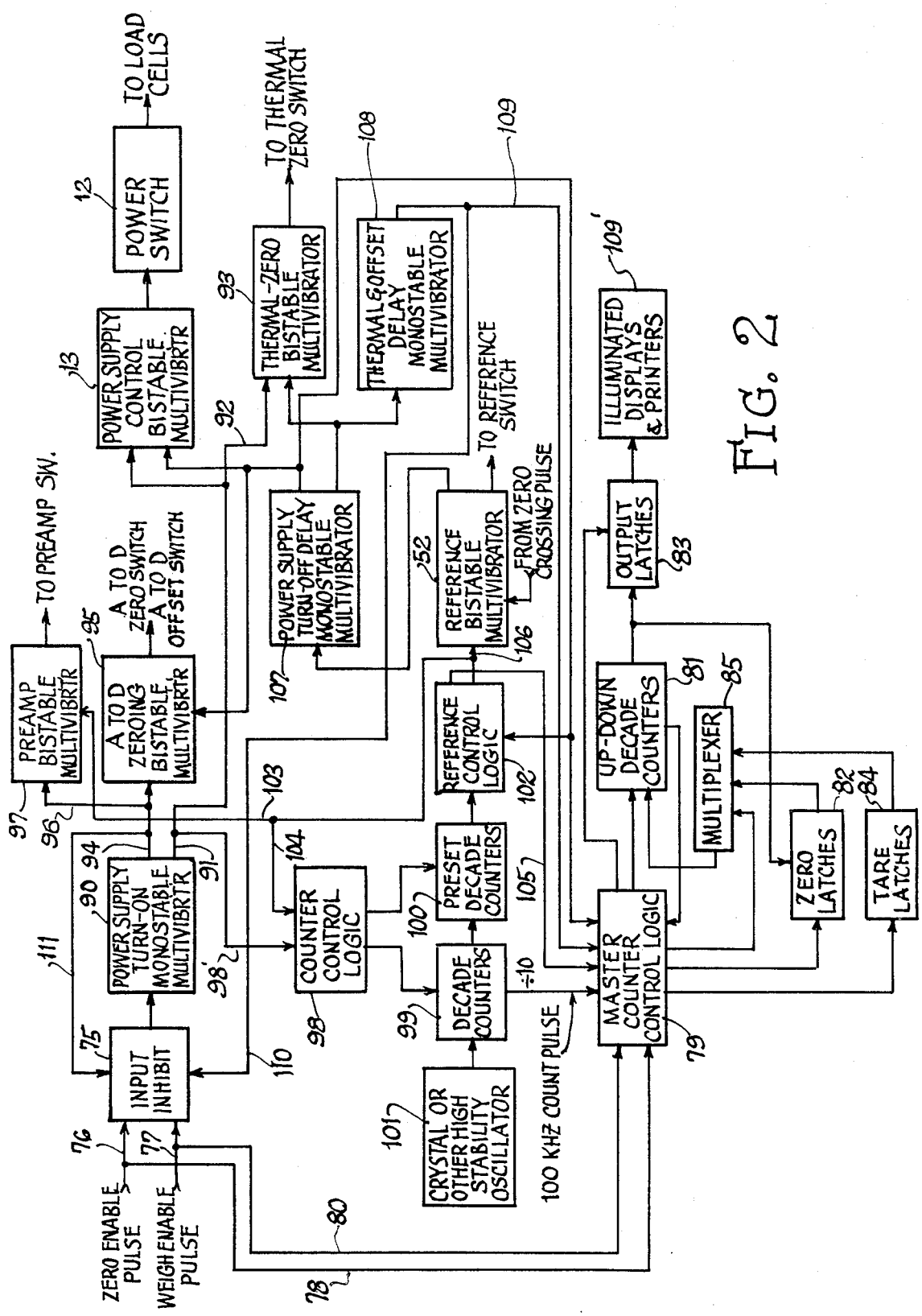
FIG. 2 is a logic block diagram of the automatic control for the different cycles of operation, i.e., the opening and closing, of the various switches shown in FIG. 1 and of the control logic for the up-down decade counters, output latches, zero (dead load zero) latches, and tare latches also shown.

Referring to FIG. 1, a power supply 11 is connected to a power switch 12 that is opened or closed, i.e., turned off or on, by the operation of the system logic shown in FIG. 2, specifically by the state of an output of a power supply control bistable multivibrator 13 (FIG. 2). The switch 12 is connected by lines 14 and 15 to load cells 16 in a conventional manner and to a differential input operational amplifier 17. The load cells 16 provide a voltage signal through an input filter 18 to a preamplifier 19 by an input line 20. The filter 18 is present to remove power line signals and miscellaneous switching noise. The other input of preamplifier 19 is coupled to a feedback circuit including a resistor 21 and an input line 22 in the conventional manner. The resistor 21 is connected to the output line 23 of preamplifier 19 by a line 24.

The output of preamplifier 19 is connected by a line 25, connected to line 23, to a thermal zero switch 26 of a compensating circuit having its output connected by a line 27, a resistor 28, and a line 29 to preamplifier input line 22. The compensating circuit includes an integrator 30 with its feedback capacitor 31 and input resistor 32, that is in the line connecting integrator 30 to switch 26. The output of integrator 30 is coupled to an inverter 33 by a line containing the latter's input resistor 34. To that line is connected the inverter's feedback circuit having a resistor 35.

The input line 22 of preamplifier 19 is connected by a resistor 36 and a line 37 to analog zeroing resistors/pots 38. The voltage input to analog zeroing resistors/pots 38 is obtained by connecting resistors/pots 38 through a line 39 to output line 40 of differential input operational amplifier 17. By adjustment of resistors/pots 38, when switch 12 is off and switch 26 is on, there is obtained a voltage input to preamplifier 19 via input line 22 equal, but of opposite sign, to that of input line 20, whereby then there is output of preamplifier 19. This is an initial condition. This type of zeroing has the desirable feature that this zero setting does not change when the power supply voltage applied across load cells 16 changes. This is because the load cell output voltage and the reference voltage, obtained as described below from amplifier 17, change by the same ratio.

When there is a change in the thermal voltage of load cells 16 and/or a change in the offset voltage and current of preamplifier 19, there is an automatic compensation by the compensating circuit while switch 26 is closed. This is because any change when that switch is on and switch 12 is off, will result in an output of preamplifier 19 generating a signal to integrator 30 so that its output through inverter 33 provides a change in the voltage to input line 22 such that the output from preamplifier 19 is changed to zero volts.

The output line 23 is connected by a line 41 to a preamplifier switch 42 connected to a line 43. An A to D integrator 44 has its input line 45 connected to its input resistor 46 that is connected to line 43. The integrator 44 has its feedback circuit including its capacitor 47 connecting the output of integrator 44 to its input in the conventional manner.

The output of integrator 44 is coupled to the input of a DC amplifier/comparator 48 having its output line 49 coupled by a line 50 to an AC coupled DC amplifier 51 that has its output coupled to a reference bistable multivibrator 52 (FIG. 2).

The output line 49 is connected also to a line 53 connected to an A to D offset switch 54. A sample-and-hold circuit 55 has its input connected to switch 54. The output of circuit 55 is connected to input line 45 of A to D integrator 44 by a line 56, a resistor 57, a line 58 and a resistor 59. The line 58 is connected to ground through a resistor 60.

The circuit including sample-and-hold circuit 55 and its output's connection to the input of integrator 44 provides, while switch 54 is on, and then maintains, while switch 54 is off, a voltage to integrator 44 that compensates for any offset voltage of integrator 44. This compensating voltage is maintained while switch 42 is on and later while a reference switch 61 is on. The switch 61 is off while switch 26 is on and later while switch 42 is on.

The reference switch 61 is connected to line 43 and thereby to A to D integrator 44 by a line 62. The line 62 is connected to ground through an A to D zero switch 63 that is on while switch 54 is on and is off when preamplifier switch 42 is on and later when reference switch 61 is on. The switch 61 is connected to the output of span coarse and fine adjustments resistors/pots 64 provided with an input voltage by an output line 65 of a reference summing amplifier 66 having a feedback circuit with a resistor 67. The input of amplifier 66 is connected through the amplifier's input resistor 68 to output line 40 of differential input operational amplifier 17.

The output of reference summing amplifier 66 also includes a linearity correction 70 connected to amplifier 66 by a line 71 and connected by a line 72 to line 41 containing the output voltage of preamplifier 19. The linearity correction 70 consists of a multipoint piecewise linear correction or a parabolic correction.

In FIG. 2 it is seen that there can be two different input pulses, called zero enable pulse and weigh enable pulse, to initiate one or the other of two different cycles of operation, namely, a zero cycle and a weigh cycle, respectively. These pulses are to two different inputs of an input inhibit 75 by lines 76 and 77. The line 76 also provides through a connecting line 78 a pulse to an input of a master counter control logic 79 for a zero cycle. The line 77 also provides through a connecting line 80 a pulse to another input of logic 79 for a weigh cycle.

The zero cycle provides a final digital count in up-down decade counters 81 that is entered at the completion of the cycle in zero latches 82 rather than in output latches 83 as is the case for a weigh cycle. The count entered in zero latches 82 represents the weight of the platform, whereas the count entered in the output latches 83 represents the net weight of the load, i.e., the gross weight of the load on the platform less the weight of the tare, i.e., the weight of the container in which the product to be weighed is present on the platform.

The tare weight is entered manually in tare latches 84 and that digital value is entered in up-down counters 81 through a multiplexer 85 when signaled to do so by logic 79. That occurs during the weigh cycle after counters 81 reach zero count in the down count mode. That mode is enabled by logic 79 when the digital value of zero latches 82 is entered in up-down counters 81 through multiplexer 85 when the latter is signaled by logic 79 to do so. When the zero count of counters 81 is reached by the down count of pulses received through logic 79 after entry of the value corresponding to that in tare latches 84, logic 79 enables counters 81 to the up count mode. The pulse counting continues to accumulate the net weight of the load. The pulses to counters 81 ceases when a pulse is generated by amplifier 51.

That pulse of amplifier 51 is called a zero crossing pulse. That pulse occurs when the output of amplifier/comparator 48 effectively crosses zero volts. That happens when A to D integrator 44 is integrating a voltage applied through reference switch 61 when it is on. That applied voltage is directly proportional to the power supply voltage across load cells 16. That voltage applied through switch 61 is of opposite sign to that integrated first by integrator 44 for a fixed period of time and applied through preamplifier switch 42 while it is on for that time interval. That applied voltage through switch 42 was directly proportional to the analog output voltage of load cells 16 when power switch 12 is also on. This is because the compensating circuit then is maintaining in line 29 and thereby applying to line 22 a voltage compensating for the thermal voltage of the load cell circuit and for the offset voltage and current of preamplifier 19.

The time it takes for the integration of the reference voltage to reduce the input voltage to amplifier/comparator 48 is dependent upon the integrated voltage generated by A to D integrator 44 from the output voltage component of the voltage signal of load cells 16 during the preceding fixed period of time during which switch 42 is on. During the time that the input voltage to amplifier/comparator 48 is being reduced to zero, pulses of fixed frequency are received and counted by counters 81 through logic 79, that enables counters 81 to do so at the end of the fixed period of time. The logic 79 is signaled to stop sending pulses to counters 81 when there is the zero crossing pulse generated by amplifier 51. That signal is received indirectly as described later.

Before either cycle of operation, power switch 12 is off, thermal zero switch 26 is on, preamplifier switch 42 is off, reference switch 61 is off, and A to D offset switch 54 and A to D zero switch 63 are on. As a result, during that time there is essentially no output voltage of preamplifier 19. This is because the voltage applied by line 29 to an input of preamplifier 19 has been generated to the extent required to compensate for the thermal voltage of load cells 16 and for the offset voltage and current of preamplifier 19. Also during that time sample-and-hold 55 has generated an output voltage to compensate for the offset voltage of A to D integrator 44 and that value is the voltage maintained as an input to integrator 44 while switches 54 and 63 are off during the times that switch 42 is on and later switch 61 is on during a weigh cycle or a zero cycle.

When a weigh enable pulse is sent by line 77 to input inhibit 75 a pulse is sent by the latter to a power supply turn-on monostable multivibrator 90 that provides a negative pulse by a line 91 to power supply control bistable multi-vibrator 13 so that its output coupled to power switch 12 changes state whereby switch 12 is turned on and thus power is applied to load cells 16 and power by lines 14 and 15 is applied to differential input operational amplifier 17. At the same time the output pulse in line 91 by a connecting line 92 triggers a thermal-zero bistable multivibrator 93 and its output connected to thermal zero switch 26 changes state whereby switch 26 is turned off. Monostable multivibrator 90 also enables a counter control logic 98 through a line 98' connecting line 91 to logic 98. The logic 98 then resets decade counters 99 and preset counters 100.

The monostable multivibrator 90 also provides a positive pulse at another output to which is connected a line 94. At the trailing edge of that pulse in line 94, an A to D zeroing bistable multivibrator 95 coupled to line 94 is triggered. This causes a change of state of an output of multivibrator 95 coupled to A to D zero switch 63 and A to D offset switch 54, whereby these two switches are turned off. A line 96 connected to line 94 and to an input of a preamplifier bistable multivibrator 97 provides that positive pulse so that multivibrator 97 is triggered when multivibrator 95 is triggered. This produces a change of state at an output of multivibrator 97. That output is coupled to preamplifier switch 42 and that change of state turns on switch 42.

It is seen that at the start of the first phase of the weigh cycle thermal switch 26 is turned off and power switch 12 is turned on by the end of the leading edge of a negative pulse at an output of monostable multivibrator 90 triggering bistable multivibrators 93 and 13, respectively. The time of the first phase of the weigh cycle is controlled by power supply turn-on monostable multivibrator 90. This first phase provides sufficient time for the power supply applied to load cells 16 to reach full power voltage level and for the voltages in line 37, via differential input operational amplifier 17, and in line 20 to reach full stable voltage so that there is full stable voltage in line 41 before start of the next phase of the weigh cycle. The thermal zero switch 26 is turned off at the start of the first phase so that the output voltage of integrator 30 and thus the compensating voltage in line 29 providing an input to preamplifier 19 are maintained until after the second phase of the cycle. Actually they are maintained until the last phase of the cycle when switch 26 is turned on, as described later.

The preamplifier switch 42 is still off during this first phase of the weigh cycle and thus is off until the output voltage of load cells 16 is stabilized. This stabilization occurs when the voltage of the power supply applied to load cells 16 has stabilized. During this first phase, switches 54 and 63 are not affected and thus remain on. This is because there is no change in the state of the output of bistable multivibrator 95 and the existing signal of that output keeps those switches on, until multivibrator 95 is triggered in the second or next phase that starts at the end of the positive pulse at the other output of monostable multivibrator 90. Because switches 54 and 63 are on, the thermal and offset compensation of A to D integrator 44 continues until the first phase is completed.

The second phase of the weigh cycle starts with the triggering of bistable multivibrators 95 and 97. The switches 54 and 63 are turned off by the change of state of an output of multivibrator 95. The turning off of switch 54 forces sample-and-hold 55 to hold the thermal and offset compensation associated with A to D integrator 44 throughout the second and third phases of the weigh cycle, i.e., until the fourth phase when switches 54 and 63 are turned on, as described later. At the start of the second phase the switch 42 is turned on by the triggering of multivibrator 97. During the second phase the level to which A to D integrator 44 is charged is directly proportional to the analog output voltage of load cells 16 generated by the weight of the platform and the gross load on the platfrom because the thermal voltage of the load cells 16 and the offset voltage and current of preamplifier 19 are being compensated by the voltage in line 29 maintained with switch 26 of the compensating circuit being off.

The decade counters 99 are coupled to a crystal or other high stability oscillator, as a clock oscillator, 101 that illustratively provides 1,000 KHz pulses. The preset decade counters 100 are coupled to decade counters 99 in a illustrative divide by $10^4$ manner to provide 100 Hz pulses to preset decade counters 100 until a pulse output of the final preset counter of preset counters 100 is sent to a reference control logic 102 to which that output is coupled. From the time that counters 99 and 100 are reset until that pulse is sent to logic 102, the integration by A to D integrator 44 of the input voltage from preamplifier 19 occurs. This integration is thus over a fixed period of time precisely determined by the entered preset of preset counters 100, number of counters in decade counters 99 and the frequency and associated stability of clock oscillator 101.

This second phase, which is an integrating period, ceases when the preset pulse output is sent to reference control logic 102. This starts the third phase of the weigh cycle. The logic 102 then sends a pulse by line 103 to preamplifier bistable multivibrator 97 to turn off preamplifier switch 42. At the same time, counter control logic 98, coupled by a line 104 connected to reference control logic 102 by line 103 receives a pulse to reset decade counters 99 and preset decade counters 100. By a line 105 reference control logic 102 enables master control logic 79 that is coupled to decade counters 99 in an illustrative divide by 10 manner so that logic receives 100 KHz pulses that are sent by logic 79 to up-down counters 81 to be counted during the interval that reference switch is on, i. e., during the third phase of the cycle. At the time that logic 79 is enabled, it enables the down count mode of counters 81.

The start of the third phase of the cycle by the output pulse of preset decade counters 100 also triggers bistable multivibrator 52 because a line 106, coupled to the input of multivibrator 52, is connected to line 103 that receives the pulse from logic 102. The output of multivibrator 52 changes state and thus reference switch 61 is turned on. When this happens at the start of the third phase, a reference voltage is applied by line 62 to A to D integrator 44. That voltage is of opposite sign to that voltage applied to integrator 44 from preamplifier 19 when switch 42 was on during the second phase of the cycle.

The reference voltage provides a reverse direction voltage directly proportional to the power supply voltage across load cells 16. This relationship compensates any load cell power supply drift. That voltage across load cells 16 is converted from a floating differential signal to a precise signal referenced to circuit ground at the output of differential input operational amplifier 17 and the precise value is set by the use of the circuitry, including reference summing amplifier 66, linearity correction 70, and resistors/pots 64, as previously described.

When master counter control logic 79 is enabled, it enables multiplexer 85 to enter in up-down counters 81 the digital value in zero latches 82 that represents the dead weight of the platform. The counters 81 will count down the 100 KHz pulses from logic 79 while the reference voltage is being integrated by A to D integrator 44. When the count in counters 81 is zero, up-down counters 81 signal logic 79 which then enables multiplexer 85 to enter in counters 81 the digital value in tare latches 84 representing the weight of the container, e.g., truck, of the load being weighed. The down count continues. When zero is reached again, counters 81 signal logic 79 that then enables counters 81 in the up count mode to accumulate pulses for the balance of the time that the reference voltage is being integrated by A to D integrator 44 The accumulated count of pulses represents the net weight of the load.

This accumulation of count of pulses continues until the integration of the reference voltage changes the output of DC amplifier/comparator 48 to zero volts. At that time the output of amplifier/comparator 48 effectively crosses zero volts, AC coupled DC amplifier 51 provides a zero crossing pulse to turn off reference switch 61, because the pulse is an input to reference bistable multivibrator 52 thereby changing its output's state. This effectively stops integration of the reference voltage and thus completes the third phase of the weigh cycle.

When multivibrator 52 is switched off by the zero crossing pulse, a power supply turn-off delay monostable multivibrator 107 is triggered and it triggers off power supply control bistable multivibrator 13 to turn off power switch 12 and triggers A to D zeroing bistable multivibrator 95 to turn on switches 54 and 63. The turning on of switches 54 and 63 at this start of the fourth phase of the weigh cycle is done to start the thermal and offset compensation of A to D integrator 44 as soon as possible. The monostable multivibrator 107 also then signals master counter control logic 79 to stop sending pulses to up-down counters 81 so that accumulation of count of pulses ceases.

The fourth phase of the cycle ends and the fifth phase starts when the output levels of power supply turn-off delay monostable multivibrator 107 return to their steady state levels. Because the power switch 12 was turned off at the start of the fourth phase, the voltage to load cells 16 decreased to zero before the start of the fifth phase, during which switch 26 will be on. Thus the amount of compensation for preamplifier offset and zeroing is minimized.

At the start of the fifth phase, monostable multivibrator 107 triggers thermal-zero bistable multivibrator 93 whereby thermal zero switch 26 is then on. The monostable multivibrator 107 also triggers a thermal & offset delay monostable multivibrator 108 that after its delay returns to its steady state when it then provides a pulse by a line 109 to master counter control logic 79 which then enables output latches 83 into which the count in up-down counters 81 is entered and stored. The latches 83 are coupled to illuminated displays and printers 109' that receive the stored count.

The line 109 is connected to a line 110 that is coupled to input inhibit 75. The pulse via line 110 from multivibrator 108 releases the inhibit provided during the first phase by a pulse, via line 94 and a line 111, from power supply turn-on monostable multivibrator 90 when its outputs returned to their steady state. The inhibit pulse via line 111 prevented enabling of input inhibit 75 and thus prevented triggering of monostable multivibrator 90 by another weigh enable pulse, if applied by line 76, or by a zero enable pulse, if applied by line 77, until the cycle is completed by the pulse in the fifth phase to input inhibit 75 from monostable multivibrator 108.

The thermal & offset delay monostable multivibrator 108 is constructed to provide a sufficient delay time before the returns of its outputs to their steady state so that another cycle cannot be initiated until there has been sufficient time for the compensating circuits to correct for any changes that may have occurred in the thermal and offsets during the cycle.

The completion of the events recited for the fifth phase completes the weigh cycle of operation of the system. The system remains in this condition until another weigh pulse is applied to input inhibit 75 and to logic 79.

The foregoing has described the manual mode for the system to obtain a weigh cycle. To obtain a zero cycle, i.e., to enter in zero latches 82 the digital value representing the dead weight (viz. the zero weight) of the platform, a zero enable pulse is applied by line 76 to input inhibit 75 and by lines 76 and 78 to logic 79. The sequence of operation is the same as described above except that logic 79 provides a reset pulse to zero latches 82 prior to providing a latching pulse to zero latches 82, that is done instead of providing a latching pulse to output latches 83 during the fifth phase of the cycle. The final accumulated count in up-down counters 81 is thus entered in latches 82. Also logic 79 does not enable counters 81 in the down count mode and does not signal multiplexer 85 to enter in counters 81 the digital values from latches 82 or 84 at any time during the operation of the zero cycle.

The system can provide a continuous mode of operation of weigh cycles. In this case, the sequence is the same as in the manual mode of weigh cycle except that when master counter control logic 79, at the end of the fifth phase, generates a pulse used to store the outputs of up-down counters 81 in output latches 83, this output latch enable pulse is used also to generate a weigh enable pulse to line 77. In this mode of the system master counter control logic 79 initiates the first weigh pulse when the system is switched into the continuous mode.

The time delay before thermal & offset delay monostable multivibrator 108 returns to its steady state is particularly important when the system is used in the continuous mode. If there was no delay, there would be insufficient time to com-pensate for any change in the thermal and offset effects before the next weigh cycle.

The zero cycle can be performed with the continuous mode of operation of weigh cycles by interrupting a weigh cycle at its completion, performing a zero cycle, and when the zero latches are enabled, resuming the continuous mode.

Figure 3:
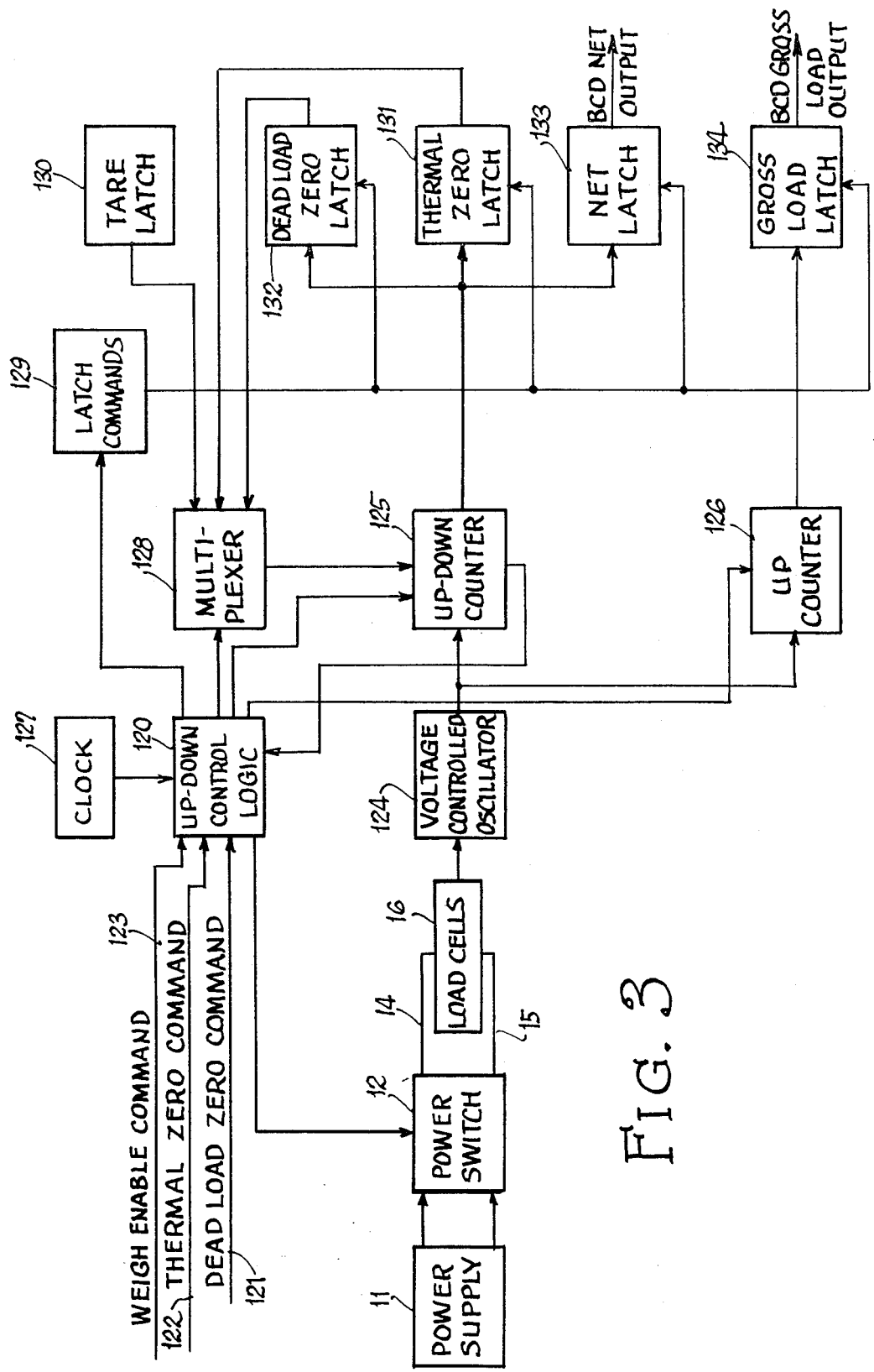
FIG. 3 is a block diagram of the other illustrative embodiment of the weighing system.

Referring to FIG. 3, the other illustrative embodiment of the system, it includes an up-down control logic 120 that can function in three different ways to control the sequence of operation, i.e., to provide three different cycles of operation. The cycle that is performed is dependent on the choice of an input pulse to logic 120.

When the input pulse is by a line 121, that is called a dead load zero command because with switch 12 on and no load on the platform, the analog-to-digital conversion is made. The digital value obtained by that cycle of operation represents the dead load, i.e., the weight of the platform.

When the input pulse is by a line 122, it is called a thermal zero command. This is because logic 120 then controls the operation to provide an analog-to-digital conversion of the thermal voltage of load cells 16 with power switch 12 first turned off by logic 120 so that no voltage from power supply 11 is applied to load cells 16 during the cycle. The digital value obtained represents the correction to be made digitally during the other two types of operational cycles of the system of this embodiment.

When the input pulse is by a line 123, it is called a weigh enable command. This is because there is performed a weigh cycle during which there is a load on the platform and power switch 12 is on. The digital value obtained by the analog-to-digital conversion represents the weight of the load. As seen in the illustrated form of this embodiment, two digital values are obtained. One represents the net weight of the load. The other represents the gross weight of the load, i.e., the net weight of product to be weighed plus the weight of the container in which the product is present on the platform. As in the description of the first embodiment, tare refers to the weight of the container.

The output voltage of load cells 16 is coupled to a voltage controlled oscillator 124 whose output pulse frequency is proportional to the output of load cells 16. The output of oscillator 124 is coupled to an up counter 126 and an up-down counter 125, which are controlled by logic 120. A clock 127 is coupled to logic to initiate and stop a sequence of operation of logic 120 to enable counter 125 to count pulses from oscillator 124 for a fixed period of time, e.g., for a second, started by a command signal to logic 120 by line 121, line 122 or line 123.

The logic 120 is coupled to a multiplexer 128 and to latch commands 129. The system includes a tare latch 130. a thermal zero latch 131, a dead load zero latch 132, a net latch 133 and a gross load latch 134. The latch commands 129 is coupled to all of these latches except tare latch 130 that is not set by the system because it is the weight of the truck or other container of the load to be weighed and the digital value of that weight is placed manually in tare latch 130.

The latch commands 129 is under the control of logic 120. The latch commands 129 selectively enables thermal zero latch 131 to enter the count in counter 125, when signaled to do so by logic 120. This entry of the count in counter 125 occurs after the fixed interval of counting pulses from oscillator 124 by counter 125 in the thermal zero cycle of operation initiated by a pulse in line 122 to logic 120. Earlier in that cycle of counting pulses, latch commands 129 provides a reset signal to thermal zero latch 131 to remove the digital value that was entered in it during a previous thermal zero cycle. The new cycle updates the digital correction for thermal voltage of load cells 16. The updating may be necessary as there may have been a shift in that voltage from the time that it was previously determined by a thermal zero cycle.

It is contemplated that the system include means to periodically provide a pulse in line 122 to update the value in thermal zero latch 131 by performing a thermal zero cycle. Of course, a suitable inhibit in logic 120 is provided to prevent the initiation through logic 120 of any new cycle while one of the cycles is in progress.

After a latching signal to thermal zero latch 131 from latch commands 129 to enter in latch 131 the digital output of counter 125 in a thermal zero cycle, latch 131 is gated closed. It is not gated open to enter a count in counter 125 until signaled by latch commands 129 in the next thermal zero cycle that is performed.

For a dead load zero cycle, latch commands 129 by a signal from logic 120 resets dead load latch 132 and then after the fixed period of time of counting pulses by counter 125 latch commands 129 provides a latching signal to latch 132 to enter that count. The latch 132 is then inhibited until enabled during a new dead load zero cycle. Because the weight of the platform is not subject to change unless debris or the like has been left on it, the dead load zero cycle is performed only at infrequent intervals.

For a weigh cycle, latch commands 129 resets net latch 133 and gross latch 134 and at the end of the fixed period of time of counting pulses in counter 125 latch commands 129 provides a latching pulse to latch 133 and a latching pulse to latch 134 to enter in them the outputs of counters 125 and 126, respectively. These latches are then inhibited so that a count will not be entered in them from the counters by new latching pulses until the next weigh cycle. The count in latches 133 and 134 can be displayed and/or printed automatically.

For a thermal zero cycle, logic 120 signals switch 12 and it turns off. The multiplexer 128 is not gated open by logic 120. After a predetermined interval to allow output voltage of load cells 16 to cease except for thermal voltage of the load cell circuitry, logic 120 resets and enables up-down counter 125 in the up count mode. The count of pulses is accumulated by counter 125 for the entire period of time fixed by logic 120. The up counter 126 is not enabled by logic 120 during any part of this cycle. At the end of the fixed period the count is entered in thermal zero latch 131 that is first reset and then enabled to do so by a latching signal from latch commands 129. To complete the cycle, logic 120 signals switch 12 and it turns on.

For a dead load cycle initiated by a pulse in line 121, logic 120 does not signal switch 12 so that it remains on during the entire cycle. The logic resets up-down counter 125 and enables it in the down count mode. The logic signals multiplexer 128 and the latter sets the output of up-down counter 125 to the same value as that in thermal zero latch 131. The pulses from oscillator 124 are counted down by counter 125 until the output of counter 125 reaches zero. When this occurs, counter 125 signals logic 120 that then enables counter 125 in its up count mode and counting of pulses continues for the rest of the fixed period. Then counter 125, as is the case for the other cycles of operation, is signaled by logic 120 and counting ceases. The logic 120 through latch commands 129 resets dead load zero latch 132 and enables it to enter a value corresponding to the output of counter 125. That count represents the weight of the platform and does not include part of the A to D conversion value corresponding to the thermal voltage of load cells. This is because that part of the digital value from the conversion was eliminated from the count during the down count mode of counter 125.

For a weigh cycle initiated by a pulse in line 123, the sequence of operation is the same as that for a dead load zero cycle up through the down count to zero. The up-down counter 125 then signals logic 120 but it does not change the count mode of counter 125. Instead logic 120 signals multiplexer 128 to enter into counter 125 the count in dead load zero latch 132. Counting of pulses continues. When the count in counter 125 reaches zero, counter 125 again signals logic 120. The logic 120 resets and enables counter 126 to start an accumulation of pulses. Then logic 120 does not change the count mode of counter 125. At the same time that up counter 126 is reset and enabled, logic 120 signals latch commands 129 to set up-down counter 125 to the value in tare latch 130 and the down count of counter 125 continues until zero is again reached by counter 125.

When counter 125 reaches zero for this third time, it signals logic 120 that then changes counter 125 to the up count mode. The counters 125 and 126 continue to accumulate counts of pulses until the end of the fixed period of time, when logic 120 gates closed these counters so that no more pulses are received by the counters. Then logic 120 through latch commands 129 first resets and then enables net latch 133 and gross load latch 134 to enter in them the values corresponding to the output of counters 125 and 126, respectively. Those digital values represent the weight of the product and the gross weight of the load that has been weighed.

In the weigh cycle the digital value based on the thermal voltage of load cells 16 with power off and the digital value corresponding to the output voltage of load cells 16 due to the weight of the platform with power applied to load cells 16 are subtracted digitally from the total number of pulses in the fixed period of time due to the analog voltage representing those voltages and that due to the gross weight of the load being weighed. Similarly subtracted was the tare. Thus the final count in counter 125 is the number of pulses directly proportional to the analog voltage due to the net weight, i.e., the weight of the product being weighed. Because the system does not count pulses during the fixed interval until there has been generated a number of pulses corresponding to those due to the thermal voltage and the output voltage generated by the weight of the platform, the final count in up counter 126 is directly proportional to the gross weight of the load, i.e., the output voltage generated by load cells 16 due to the gross weight of the load.

The foregoing has described details of two embodiments of the system of the invention. Other embodiments of the system will be apparent from that description. The two embodiments have been presented merely for illustration of the system. The invention is limited only by the claims that follow.

We claim:

1. A system for digital weighing by utilizing an analog voltage of load cells generated in part by a load to be weighed, which comprises:
   a switch to couple the load cells to a power supply;
   means to turn on and turn off said switch;
   an analog-to-digital converter;
   means operative, with said switch on, for a weigh cycle of operation of the system to couple said converter to the output of the load cells for at least part of an operation of said converter so as to generate a digital output from an analog voltage output of the load cells due at least in part to the weight affecting the cells;
   means operative, only with said switch off, for a separate thermal zero cycle of operation of the system to generate and store a signal having a magnitude based in part on the thermal voltage component only of the voltage output of the load cells;
   means to utilize said stored signal in said converter during a part only of the operation of said converter for the weigh cycle of operation of the system in a manner to provide a final digital output of said converter essentially devoid of any digital value representative of said thermal voltage of the load cells; and
   control logic means to inhibit the operation of said means operative for said thermal zero cycle of operation during the operation of said means operative for said weigh cycle of operation and to inhibit the operation of said means operative for said weigh cycle of operation during the operation of said means operative for said thermal zero cycle of operation.

2. A system for digital weighing by utilizing an analog voltage of load cells generated in part by a load to be weighed, which comprises:
   a first switch to couple the load cells to a power supply; means to turn on and turn off said switch;
   an analog-to-digital converter that includes:
   a preamplifier having an input to be coupled to the voltage output of the load cells;
   a second switch;
   means coupling the output of said preamplifier to said second switch;
   means to turn on and turn off said second switch;
   an integrator coupled to said second switch;
   a comparator coupled to the output of said integrator;
   a third switch;
   means coupling said third switch to said integrator to apply through said switch, when it is on and coupled to a reference voltage of opposite sign to the output voltage of said preamplifier, a voltage to said integrator;
   means to turn on and turn off said third switch;
   means to generate pulses at a predetermined frequency;
   timing means operatively coupled to said means to turn on and turn off said second switch and operatively coupled to said means to turn on and turn off said third switch whereby said timing means, when initiated, turns on said second switch for a predetermined period of time, and the turns off said second switch and turns on said third switch;
   signal-generating means responsive to the output of said comparator when it crosses zero volts. while said third switch is on, to generate a signal; and
   counter means operatively connected to count pulses from said pulse-generating means when initiated by said timing means until signaled by said signal-generating means to stop counting;
   means operative when said first switch is off and when coupled to the output of the load cells in a thermal zero cycle of operation of the system to generate and store a signal having a magnitude based in part on the thermal voltage component only of the voltage output of the load cells, said signal ang generating means including:
   a fourth switch coupled to the output of said preamplifier; means to turn on said fourth switch while said first
   switch is off; a second integrator coupled to said fourth switch; and an inverter coupled to the output of said second integrator and to another input of said preamplifier;
   meas to operatively couple said converter to the output of the load cells for at least part of an operation of said converter in a weigh cycle of operation of the system when said first switch is on to generate an analog voltage output by the load cells due to the weight affecting the cells; and
   means to utilize said stored signal in said converter during a part only of the operation of said converter for the weigh cycle of operation of the system in a manner to provide a final digital output of said converter essentially devoid of any digital value representative of said thermal voltage of the load cells, said means to utilize stored signal includes:
   means to turn off said fourth switch when said first switch is turned on,
   whereby in said system said signal-generating and signal-storing means provides a signal corresponding to the thermal voltage as an input to said preamplifier and the output voltage of said preamplifier due to offset voltage and current of said preamplifier, and whereby said signal-utilizing means maintains the stored signal as an output by said inverter to be used for an input to said preamplifier to compensate for those effects during the time that the output of said preamplifier is integrated by said first integrator for the predetermined period of time.

3. The system of claim 2 and further including a circuit to compensate for the thermal and offset voltages of said first integrator, said circuit comprising:
- a fifth switch coupled to the output of said first integrator;
- a sample-and-hold circuit coupled to said fifth switch; means coupling the output of said sample-and-hold circuit to the input of said first integrator;
- a sixth switch connected to said means coupling said third switch to said first integrator to connect said first integrator to ground when said sixth switch is on;
- means to turn said fifth and sixth switches on after said third switch is turned off; and
- means to turn said fifth and sixth switches off when said second switch is turned on.

4. The system of claim 3 wherein said counter means of said analog-to-digital converter includes:
- up-down decade counters having an up count mode and a down count mode;
- means responsive to said up-down counters reaching zero in a down count mode;
- first latches in which are to be entered the final output of said up-down counters obtained by a dead load zero cycle of operation of the system and representing no load on a weighing platform on which the load cells are mounted;
- second latches in which are to be entered the final output of said up-down counters obtained by a weigh cycle of operation of the system and representing the weight of the load on the platform;
- a multiplexer coupled to said first latches and to said up-down counters to set, when initiated, said up-down counters to the digital value of said first latches; and
- counter control logic means being:
  - coupled to said up-down counters, to said first and second latches, to said multiplexer, and to said pulse-generating means, to provide a dead load zero cycle by a sequence of operation or to provide a weigh cycle by a different sequence of operation;
  - initiated in its operation of either cycle by said timing means to reset said up-down counters at the end of said predetermined period of time and then to transmit pulses from said pulse-generating means to said up-down counters;
  - responsive to said signal-generating means to cease the transmission of said pulses to said up-down counters;
  - responsive to a pulse to initiate a dead load zero cycle of operation of said logic means to reset said first latches and then in response to the signal from said signal-generating means to trigger said first latches to enter in them the output of said up-down counters; and
  - responsive to a pulse to initiate a weigh cycle of operation of said logic means to reset said second latches, to enable said multiplexer to enter in said up-down counters the digital values in said first latches, to enable said up-down counters in the down count mode, in response to the output of said up-down counters reaching zero in the down count mode to change said up-down counters to the up count mode, and in response to the signal from said signal-generating means to trigger said second latches to enter in them the output of said up-down counters to complete the weigh cycle.

5. The system of claim 3 and further including:
- an amplifier having its output coupled to said third switch;
- a differential input operational amplifier having its output coupled to said amplifier that is coupled to said third switch; and
- means coupling the inputs of said operational amplifier to said first switch,
- whereby said reference voltage is derived from the same power supply as applied to the load cells through said first switch.

6. The system of claim 5 and further including:
- load cells coupled to said first switch and having an output coupled to said preamplifier.

7. The system of claim 5 and further including:
- a linearity correction circuit coupled to said means coupling said second switch to the output of said preamplifier and coupled to said amplifier having its output coupled to said third switch,
- said amplifier coupled to said third switch being a summing amplifier to sum the output of said operational amplifier and the output of said linear correction circuit.

8. A system for digital weighing by utilizing an analog voltage of load cells generated in part by a load to be weighed, which comprises:
- a switch to couple the load cells to a power supply;
- means to turn on and turn off said switch;
- an analog-to-digital converter that includes:
  - a voltage controlled oscillator having an input to be coupled to the output of the load cells to obtain at the output of said oscillator pulses with a frequency proportional to the voltage at its input;
  - an up-down counter coupled, when enabled, to the output of said oscillator to count said pulses; and
  - a clock to provide a first signal to enable said counter and later a second signal to gate close said counter, whereby said counter counts pulses from said oscillator for a predetermined period of time, said clock being coupled to said counter;
- means operative when said switch is off and when coupled to the output of the load cells to generate and store a signal having a magnitude based in part on the thermal voltage component only of the voltage output of the load cells, said signal and generating means including:
  - means to operatively couple said oscillator to said counter for an up count mode only during said predetermined time interval as a thermal zero cycle of operation of said converter while said switch is off; and
  - first latch means coupled to said counter when signaled to enter in said first latch means the final output of said counter obtained by the thermal zero cycle of operation of said converter;
- means to operatively couple said converter to the output of the load cells, while said switch is on for at least part of an operation of said converter to generate an analog voltage output by the load cells due to the weight affecting the cells, that constitutes:

means, while said switch is on, to operatively couple the output of said oscillator to said counter during said predetermined time interval as a weigh cycle of operation of said converter; and means to utilize said stored signal in said converter during a part only of the operation of said converter for a weigh cycle of operation of the system in a manner to provide a final digital output of said converter essen-tially devoid of any digital value representative of said thermal voltage of the load cells, said means to utilize said stored signal in said converter during a part only of the operation of said converter for the weigh cycle, which part is while said switch is on, comprising:
  means operative to reset said counter and at the start of said time interval to set said counter to the digital value of said first latch means, containing the stored value from a previous thermal zero cycle of operation of the system;
  means to change said counter to the down count mode at the start of said time interval; and
  means to change said counter to the up count mode when signaled by said counter that its count has decreased to zero during that time interval,
said system further including:
  second latch means coupled to said counter when signaled to enter in said second latch means the final output of said counter obtained by the weigh cycle of operation of said converter;
  means responsive to a signal for a thermal zero cycle of operation to operate said switch-turning means to turn off said switch, to provide said coupling between said clock and said counter through said means operatively coupling said oscillator to said counter for counting during said time interval, and to provide at the end of said time interval a signal to said first latch means; and
  means responsive to a signal for a weigh cycle of operation to signal said switch-turning means to turn on said switch if off, to provide said coupling between said clock and said counter through said means operatively coupling said oscillator to said counter for counting during said time interval, and to provide at the end of said time interval a signal to said second latch means.

9. A system for digital weighing by utilizing an analog voltage of load cells generated in part by a load to be weighed, which comprises:
  a switch to couple the load cells to a power supply;
  a voltage controlled oscillator having an input to be coupled to the output of the load cells to obtain at the output of said oscillator pulses with a frequency proportional to the voltage at its input;
  an up-down counter coupled, when enabled, to the output of said oscillator;
  counter control logic means
    having a first input to receive a pulse for a thermal zero cycle of operation and a second input to receive a pulse for a weigh cycle of operation, coupled to said switch to turn off said switch when a pulse is received by said first input of said logic means and to turn on said switch if necessary when a pulse is received by said second input of said logic means, and coupled to said counter to reset it, to set its count mode and to be signaled by said counter when it reaches zero in a down count;
  a clock coupled to said logic means to provide a signal to it to start a cycle of operation of it after said logic means receives a pulse at one of said inputs and to provide after a predetermined period of time a second signal to said logic means;
  first and second latch means coupled, when enabled, to be reset and then set with the final count of said counter at the end of said time interval for the weigh cycle and for the thermal zero cycle, respectively;
  latch commands coupled to said logic means and to said first and second latch means to enable selectively said first or second latch means to be reset and then set to said final count of said counter for a weigh cycle or a thermal zero cycle, respectively, when said latch commands is signaled by said logic means; and
  a multiplexer coupled to said second latch means, to said logic means and to said counter to set said counter to the digital value of said latch means after resetting of said counter when said logic means is initiated in its weigh cycle of operation by a signal to its said second input,
said logic means when initiated for a weigh cycle or a thermal zero cycle resetting and enabling said counter for the start of said time interval, changing said counter at the start to a down count mode for a weigh cycle, changing the mode of said counter to the up count mode when said counter provides said signal upon reaching zero in the down count, gating closed said counter to cease counting of pulses when said logic means receives said second pulse from said clock, and signaling said latch commands selectively to reset and enable said first and second latch means at the conclusion of said time interval.

10. The system of claim 9 and further including:
  third latch means coupled to said counter to be set, when enabled, with the final count of said counter at the end of said time interval for a dead load cycle, and
  wherein said logic means has a third input for a pulse for a dead load cycle of operation of said logic for said time interval determined by said signals for said clock,
  wherein said latch commands is coupled to said third latch means to reset it and selectively, when signaled by said logic means at the end of said time interval of said dead load cycle, to set it with the final count of said counter,
  wherein said third latch means is coupled to said multiplexer to set said counter to the output of said third latch means, when said multiplexer is signaled by said logic means, to the digital value of said third latch means obtained by a dead load cycle of operation,
  wherein said logic means, when signaled by said counter upon reaching zero in the down count of the count entered into said counter to equal that in said second latch means, in a weigh cycle signals said multiplexer to enter into said counter said valve of said third latch means without changing the count mode, and
  wherein said logic means in its weigh cycle of operation provides a signal to change said counter to the up count mode after a second signal from said counter that it has counted down to zero.

11. The system of claim 10 and further including:

tare latch means in which are to be entered the weight of a container in which a product is to be weighed while both are on a weighing platform on which the load cells are mounted, said tare latch means being coupled to said multiplexer, and wherein said logic means provides said signal to said multiplexer to enter in said counter the digital value of said tare latch means when said logic means during a weigh cycle is signaled by said counter reaching zero for the second time in the down count mode, provides said signal to said counter to change it to the up count mode only when said counter reaches zero for the third time, and provides said signal to said latch commands to reset and enable said first latch means at the conclusion of said time interval, whereby the digital value entered in said first latch means is the weight of the product.

12. The system of claim 11 and further including:

an up counter coupled to said logic means and to said oscillator, when enabled by said logic means; and gross load latch means coupled to said latch commands and, when signaled by said latch commands, coupled to said up counter, said logic means in a weigh cycle providing a signal to reset said up counter when said down counter reaches zero for the second time, to count pulses from said oscillator for the balance of said time interval, then to gate close said up counter and to signal said latch commands to reset and enable said gross load latch means to be set to the final count of said up counter as the weight of said product and the container.

13. A system for digital weighing by utilizing an analog voltage of load cells generated in part by a load to be weighed, which comprises:

a switch to couple the load cells to a power supply;

means to turn on and turn off said switch;

means operative when said switch is off and when coupled to the output of the load cells to generate and store a signal having a magnitude based in part on the thermal voltage component only of the voltage output of the load cells;

an analog-to-digital converter;

means operative, with said switch on, for a weigh cycle of operation of the system to couple said converter to the output of the load cells for at least part of an operation of said converter, so as to generate a digital output from analog voltage output of the load cells due at least in part to the weight affecting the cells;

means operative, with said switch on, for a dead load zero cycle of operation of the system to couple said converter to the output of the load cells for at least part of an operation of said converter so as to generate and store a digital output from a voltage input to said analog-to-digital converter obtainable when no load is present to be weighed by the system;

means to utilize said stored signal in said converter during a part only of the operation of said converter for a dead load zero cycle of operation of the system in a manner to provide a final digital output of said converter essentially devoid of any digital value representative of said thermal voltage of the load cells;

means to utilize said stored digital output, obtained by said dead load zero cycle of operation of the system, in said converter during a part only of the operation of said converter for a weigh cycle of operation of the system in a manner to provide a final digital output of said converter that does not include the digital output due to the operation of the converter on an input to said converter representative of any effect other than the weight of the load; and means to utilize said stored signal in said converter during a part only of the operation of said converter for a weigh cycle of operation of the system in a manner to provide a final digital output of said converter essentially devoid of any digital value representative of said thermal voltage of the load cells.

14. A system for digital weighing by utilizing an analog voltage of load cells generated in part by a load to be weighed, which comprises an analog-to-digital converter that includes:

a preamplifier having an input to be coupled to the voltage output of the load cells;

a first switch;

means coupling the output of said preamplifier to said first switch;

means to turn on and turn off said first switch;

an integrator coupled to said first switch;

a comparator coupled to the output of said integrator;

a second switch;

means coupling said second switch to said integrator to apply through said second switch, when it is on and coupled to a reference voltage of opposite sign to the output voltage of said preamplifier, a voltage to said integrator;

means to turn on and turn off said second switch;

means to generate pulses at a predetermined frequency;

timing means operatively coupled to said means to turn on and turn off said first switch and operatively coupled to said means to turn on and turn off said second switch whereby said timing means, when initiated, turns on said first switch for a predetermined period of time, and then turns off said first switch and turns on said second switch;

signal-generating means responsive to the output of said comparator when it crosses zero volts, while said second switch is on, to generate a signal; and counter means operatively connected to count pulses from said pulse-generating means when initiated by said timing means until signaled by said signal-generating means to stop counting, said counter means including: up-down decade counters having an up count mode and a down count mode;

means responsive to said up-down counters reaching zero in a down count mode;

first latches in which are to be entered the final output of said up-down counters obtained by a dead load zero cycle of operation of the system and representing no load on a weighing platform on which the load cells are mounted;

second latches in which are to be entered the final output of said up-down counters obtained by a weigh cycle of operation of the system and representing the weight of the load on the platform;

a multiplexer coupled to said first latches and to said up-down counters to set, when initiated, said up-down counters to the digital value of said first latches; and counter control logic means being:

coupled to said up-down counters, to said first and second latches, to said multiplexer, and to said pulse-generating means, to provide a dead load zero cycle by a sequence of operation or to provide a weigh cycle by a different sequence of operation:

initiated in its operation of either cycle by said timing means to reset said up-down counters at the end of said predetermined period of time and then to transmit pulses from said pulse-generating means to said up-down counters;

responsive to said signal-generating means to cease the transmission of said pulses to said up-down counters;

responsive to a pulse to initiate a dead load zero cycle of operation of said logic means to reset said first latches and then in response to the signal from said signal-generating means to trigger said first latches to enter in them the output of said up-down counters; and responsive to a pulse to initiate a weigh cycle of operation of said logic means to reset said second latches, to enable said multiplexer to enter in said up-down counters the digital values in said first latches, to enable said up-down counters in the down count mode, in response to the output of said up-down counters reaches zero in the down count mode to change said up-down counters to the up count mode, and in response to the signal from said signal-generating means to trigger said second latches to enter in them the output of said up-down counters to complete the weigh cycle.

* * * * *

UNITED STATES PATENT OFFICE
CERTIFICATE OF CORRECTION

Patent No. 3,797,595   Dated  March 19, 1974

Inventor(s)   Chieh-Kung Yin et al.

It is certified that error appears in the above-identified patent and that said Letters Patent are hereby corrected as shown below:

Column 5, line 25, "comparitor" should read --comparator--.
Column 18, line 15, "the turns" should read --then turns--.
　　　　　Line 33, "ang" should read --and--.
　　　　　Line 53, "stored" should read --said stored--.
Column 20, line 18, "claim 5" should read --claim 6--.
Column 22, line 46, "signals for" should read --signals from--.
　　　　　Line 65, "valve" should read --value--.

Signed and sealed this 2nd day of July 1974.

(SEAL)
Attest:

EDWARD M. FLETCHER, JR.
Attesting Officer

C. MARSHALL DANN
Commissioner of Patents